United States Patent [19]
Fujiwara et al.

[11] Patent Number: 5,630,770
[45] Date of Patent: May 20, 1997

[54] TOOTHED BELT

[75] Inventors: Toru Fujiwara, Tokorozashi; Tatsuo Arai, Chichibu; Yoshinori Itoh, Hanno, all of Japan

[73] Assignee: Tsubakimoto Chain Co., Osaka, Japan

[21] Appl. No.: 642,959

[22] Filed: May 6, 1996

Related U.S. Application Data

[63] Continuation of Ser. No. 424,107, Apr. 19, 1995, abandoned.

[30] Foreign Application Priority Data

Apr. 21, 1994 [JP] Japan ..................... 6-105017

[51] Int. Cl.$^6$ ........................................ F16G 1/28
[52] U.S. Cl. ............................. 474/205; 474/271
[58] Field of Search ................... 474/205, 266, 474/267, 268, 271

[56] References Cited

U.S. PATENT DOCUMENTS

| | | | |
|---|---|---|---|
| 3,937,094 | 2/1976 | Cicognani . | |
| 4,302,197 | 11/1981 | Kimura et al. | 474/267 |
| 4,518,376 | 5/1985 | Mashimo et al. | 474/261 |
| 4,721,496 | 1/1988 | Yokoyama et al. | 474/205 |
| 4,826,472 | 5/1989 | Sato et al. | 474/205 X |
| 4,832,673 | 5/1989 | Nagai et al. | 474/263 |
| 4,840,608 | 6/1989 | Araki et al. | 474/205 |
| 5,232,409 | 8/1993 | Kanamori et al. . | |
| 5,234,387 | 8/1993 | Fujiwara et al. | 474/205 |
| 5,417,619 | 5/1995 | Tajima et al. | 474/260 |
| 5,458,544 | 10/1995 | Fujiwara et al. | 474/205 |
| 5,484,341 | 1/1996 | Fujiwara et al. | 474/205 |

FOREIGN PATENT DOCUMENTS

| | | |
|---|---|---|
| 0 319 320 | 6/1989 | European Pat. Off. . |
| 0 344 350 | 12/1989 | European Pat. Off. . |
| 0 547 880 A1 | 6/1993 | European Pat. Off. . |
| 61-065937 | 4/1986 | Japan . |
| 61-165045 | 7/1986 | Japan . |
| 63-270753 | 11/1988 | Japan . |
| 1269743 | 10/1989 | Japan . |
| 5132586 | 5/1993 | Japan . |
| 1404250 | 8/1975 | United Kingdom . |

*Primary Examiner*—Frank Tsay
*Attorney, Agent, or Firm*—Armstrong, Westerman, Hattori, McLeland & Naughton

[57] ABSTRACT

A toothed belt includes a tensile body embedded therewithin and the tooth surface thereof coated with a tooth sheet, wherein the tooth sheet is treated by RFL solution including inorganic pigments. The toothed belt, after treatment by RFL solution, forms an RFL solution impregnated layer at the tooth surface thereof. Resorcin and formaldehyde are compounded in the mole ratio of 1:1 to 1:3, while resorcin and formaldehyde are compounded with latex in the weight ratio of 1:5 to 1:15. Solid content of RFL solution is compounded with inorganic pigments in the weight ratio of 20:1 to 1:2. The inorganic pigment is selected from those other than black colored series.

3 Claims, 1 Drawing Sheet

| COEFFICIENT OF FRICTION | | WEIGHT : 1kg · f<br>MATERIAL : AL OR POM |

| NOISE | MEASUREMENT OF ENGAGING SOUND OF ENGAGING PORTION OF DRIVE PULLEY BY NOISE METER | NUMBER OF REVOLUTIONS : 0~6000r/min<br>(RUNNING SPEED : 1500r/min)<br><br>MICROPHONE POSITION FROM DRIVE PULLEY : 30mm |

| AMOUNT OF WEAR POWDER | | NUMBER OF REVOLUTIONS :1500r/min<br>RUNNING HOURS : 20hr<br>RESULTING WEAR POWDER COLLECTED |

TOOTHED BELT

This application is a continuation of application Ser. No. 08/424,107, filed Apr. 19, 1995, now abandoned.

BACKGROUND OF THE INVENTION

The present invention relates to a toothed belt, and more particularly pertains to a new and improved toothed belt not only for OA ("Office Automation") related equipments, such as a printer, a plotter, and a copying machine, which are sensitive to dust and noise, but also industrial machines in general.

Conventionally, a toothed belt comprises a back rubber embedding a tensile body, and tooth rubber, wherein a tooth sheet is glued on an exposed tooth surface of the tooth rubber. The toothed belt is adapted to be looped around a periphery of the toothed pulley.

As the toothed belt is driven by the toothed pulley, the tooth sheet thereof is gradually worn away. For that reason, as for the conventional toothed belt, the tooth sheet in which rubber including carbon black is impregnated into the same rubber as the tooth rubber or the back rubber, or the tooth sheet in which rubber including graphite is impregnated thereinto has been used.

However, according to the toothed belt wherein the tooth sheet in which rubber including carbon black is impregnated thereinto, when the toothed belt contacts with the pulley while driving, a great amount of wear powder of the toothed belt and noise are generated. On the other hand, according to the toothed belt wherein the tooth sheet in which rubber including graphite is impregnated thereinto, indeed generation of the wear powder thereof and noise can, to some extent, be reduced, but it is still not sufficient to nullify the foregoing problem, because under the specific circumstances some machines are sensitive to dust and noise.

Further, according to such conventional toothed belt, the wear powder, containing carbon black or graphite, looks black, when scattered around the toothed belt and the pulley, thereby degrading the appearance therearound.

SUMMARY OF THE INVENTION

The present invention solves the above problems. On investigating the foregoing problems, it has now been discovered that improving the anti-wear property of the tooth sheet and reducing the coefficient of friction of the tooth surface are effective means for preventing generation of the wear powder. It has also been discovered that in case where the color of the wear powder is other than black, if produced, it is not noticeable.

Furthermore, it has also been discovered that reducing the coefficient of friction of the tooth surface is an effective means for preventing the generation of noise.

Thus, it is an object of the present invention to provide a toothed belt wherein the tooth sheet resists wear and abrasion.

Another object of the present invention is to provide a toothed belt wherein the wear powder, if produced, would not be noticeable.

Still another object of the present invention is to provide a toothed belt wherein the coefficient of friction can be reduced.

To attain the foregoing objects, a toothed belt according to the present invention includes a tensile body embedded therewithin and the tooth surface thereof is coated with a tooth sheet, wherein the tooth sheet is treated by RFL (resorcin-formaldehyde-latex) solution including inorganic pigments other than black series. The foregoing RFL solution is a mixed solution, in which latex of every kind is mixed with a reaction product resulting from a chemical reaction between resorcin and formaldehyde. As for latex, examples include vinyl-pyridine-styrene-butadiene latex, chloroprene latex, nitrile-butadiene latex. The foregoing treatment means an impregnation treatment.

The toothed belt, after treatment by RFL solution, forms an RFL solution-impregnated layer at the tooth surface thereof, so that anti-wear property thereof can be improved and generation of the wear powder can be prevented.

A composition of RFL solution that can be made up is as follows: resorcin and formaldehyde are compounded in the mole ratio of 1:1 to 1:3, while resorcin and formaldehyde are compounded with latex in the weight ratio of 1:5 to 1:15.

RFL solution comprises inorganic pigments. The solid content of RFL solution is compounded with inorganic pigments in the weight ratio of 20:1 to 1:2. Inorganic pigments improve anti-wear property of the toothed belt.

The foregoing inorganic pigments should be selected from those other than black colored series, so that the wear powder, if produced, can be unnoticeable. In this regard, white colored series of inorganic pigments, such as titanium oxide, calcium carbonate, and zinc oxide are preferable.

Further, it is preferable that the tooth surface of the toothed belt is coated with lubricant resin, so that the coefficient of friction of the tooth surface of the toothed belt can be reduced, and generation of wear powder and noise can be prevented. It is preferable that the coating of the resin is a fluorine series or a silicon series resin.

Furthermore, it is preferable that an oil made of fluorine series or silicon series is applied to the surface of the toothed belt, so that the coefficient of friction of the tooth surface of the toothed belt can be reduced, and generation of wear powder and noise can be prevented. The viscosity of the oil is preferably 10 cps to 10,000 cps.

BRIEF DESCRIPTION OF THE DRAWINGS

The instant invention will be more fully described and better understood from the following description, taken with the appended drawings, in which.

DETAILED DESCRIPTION OF THE PREFERRED EMBODIMENTS

Figures 1, 2, 3, 4:
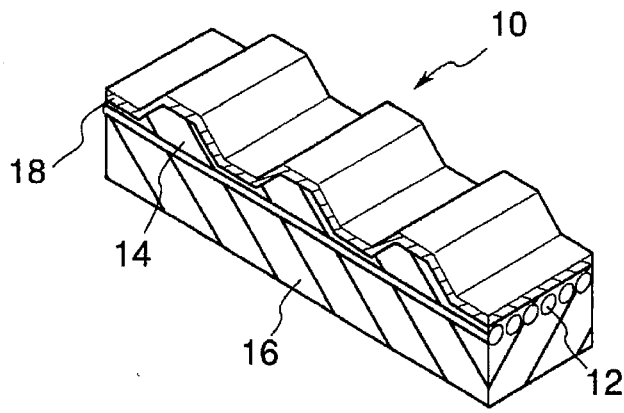
FIG. 1 is a perspective view of a toothed belt according to the present invention.
FIG. 2 is a schematic diagram showing an experimental condition for measuring coefficient of friction.
FIG. 3 is a schematic diagram showing an experimental condition for measuring noise level.
FIG. 4 is a schematic diagram showing an experimental condition for measuring wear powder.

A preferred embodiment of the present invention will now be described in detail by making comparison between a conventional example and a comparison example of the present invention.

As shown in FIG. 1, a toothed belt 10 according to the present invention comprises a tooth rubber 14 embedding a tensile body 12, and a back rubber 16, wherein a tooth surface of the tooth rubber 14 is coated with a tooth sheet 18. It is noted that a tooth surface may be formed on both sides of the toothed belt.

In this embodiment, rubber made mainly of chloroprene polymer is used for the tooth rubber 14 and the back rubber 16. Alternatively, NBR (nitrile rubber or acrylonitrile-butadiene rubber), CSM (chlorosulfonated polyethylene rubber), NR (natural rubber), EPDM (ethylene-propylene rubber), HSN (hydrogenated nitrile rubber), and silicon may be used therefor.

The tooth sheet 18 undergoes an impregnation treatment with RFL solution. RFL solution can be obtained in such a manner that latex of every kind is mixed with the reaction product resulting from a chemical reaction between resorcin and formaldehyde.

TABLE 1 shows examples of compounding ratios of RFL solution.

TABLE 1

| | Combination Example | | |
|---|---|---|---|
| R | Resorcin | (g) | 6.25 |
| F | Formalin (35%) | (g) | 9.21 |
| Solution | NaOH (10%) | (g) | 1.70 |
| | Purified Water | (g) | 134.01 |
| | Subtotal | (g) | 151.17 |
| L | Latex | (g) | 218.36 |
| Solution | Kind | | VP-SBR Latex |
| | Solid Content | (%) | (40.5%) |
| | Ammonia (28%) | (g) | 6.21 |
| | Purified Water | (g) | 624.26 |
| | Subtotal | (g) | 848.83 |
| | Total Weight Composition | (g) | 1000.00 |
| | Solid Content | (%) | 9.8% |
| | R/F Mole Ratio | | 1/1.89 |
| | RF/L Weight Ratio | | 1/9.34 |

| Addition of Inorganic Pigments | | |
|---|---|---|
| Above RFL Solution 1000 g | + | Inorganic Pigments 20 g |

RF Solution Maturing Conditions

Temperature: 5° C.
Hours: 6 h
RFL Solution Maturing Conditions

Temperature: 25° C.
Hours: 18 h
Adhesion Amount to Sheet: 50%
Treatment Condition Dry Temperature: 150° C.
Hours: 4 min.
Baking Temperature: 220° C.
Hours: 30 sec.

In the RFL solution, resorcin and formaldehyde are compounded in the mole ratio of 1:1 to 1:3. If the mole ratio thereof is beyond that range, the chemical reaction between resorcin and formaldehyde becomes considerably worse and adhesive property is degraded.

In this embodiment, vinyl-pyridine-styrene-butadiene latex, chloroprene latex, and nitrile-butadiene latex is used for latex. Alternatively, CR (chloroprene rubber), NBR, CSM, NR, EPDM, HSN and the like may be used therefor, solely or as a mixture thereof.

Resorcin and formaldehyde are compounded with latex in the weight ratio of 1:5 to 1:15. If the weight ratio thereof is more than 1:5, the tooth sheet would be cured in producing the toothed belt, thereby degrading formability thereof. On the other hand, if the weight ratio thereof is less than 1:5, not only adhesive property between resorcin and formaldehyde, but anti-wear property, due to softening of the tooth surface, would be degraded.

Inorganic pigment is compounded with solid content of RFL solution, i.e., solid content of resorcin, formaldehyde, sodium hydroxide and latex, in the weight ratio of 20:1 to 1:2. If the amount of inorganic pigment is less than the weight ratio of 20:1, anti-wear property would be degraded. On the other hand, if the amount of inorganic pigment is more than the weight ratio of 1:2, formability in producing the toothed belt would be degraded, the tooth surface would be covered with powder of inorganic pigments which cannot be fixed thereon, and it would be difficult to disperse the inorganic pigments.

It is preferable that the inorganic pigments, along with appropriate dispersant, be dispersed into purified water beforehand, by using a ball mill.

The inorganic pigments other than black colored series include such series as white, gray, red, brown, yellow, green or blue.

As for white colored inorganic pigments, examples include titanium oxide (titanium white), calcium carbonate, zinc oxide (zinc white), basic lead carbonate (white lead), a mixture (lithopone) of zinc sulfide and barium monosulfide, barite made mainly of barium sulfate, settling barium sulfate, gypsum, or settling silica.

As for gray colored inorganic pigments, examples include zinc dust, lead suboxide, or slate dust.

As for red colored inorganic pigments, examples include cadmium red, cadmium mercury red, silver cinnabar made mainly of mercuric sulfide, iron oxide red, molybdate orange, or red lead (minium) made mainly of lead tetroxide.

As for brown colored inorganic pigments, examples include amber wherein coloring content thereof is made of iron sesquioxide and manganese oxide, or iron oxide brown.

As for yellow colored inorganic pigments, examples include cadmium yellow made mainly of cadmium sulfide, zinc yellow made mainly of zinc chromate, loess (ocher and sienna) wherein color former thereof is iron, yellow iron oxide (synthesized ocher), yellow lead made mainly of chromate, or titanium yellow.

As for green colored inorganic pigments, examples include chromium oxide green, cobalt green, or chromium green which is a coprecipitation of yellow lead and iron blue.

As for blue colored inorganic pigments, examples include ultramarine blue, iron blue, iron blue made mainly of iron(II) ferrocyanide, or cobalt blue made mainly of cobalt alminate.

By using inorganic pigments having those colors other than black series, the wear powder, if produced, would be hard to be noticeable. Further, a tone of color of the toothed belt can be adjusted, so that color harmonization with surrounding equipment thereof can be performed very well.

Of the foregoing inorganic pigments, white colored series thereof, such as titanium oxide, calcium carbonate, zinc oxide (zinc white) are preferable, since they are difficult to be noticeable, stable in producing, and inexpensive.

Furthermore, it is preferable that the tooth surface of the toothed belt is coated with a resin having lubricity. Silicon or fluorine series can be used for a coating of the resin. When the resin coating of the silicon series is used for the tooth sheet, a comparatively hard resin thereof is selected, because if the tooth sheet is soft, the coefficient of friction thereof would be increased in transforming of the toothed belt, which in turn may increase noise therefrom. It is preferable that the silicon resin has a pencil hardness of 3B to H, being baked, but the silicon resin with higher hardness than that may be used.

As in using the silicon series, when the resin coating of the fluorine series is used for the tooth sheet, a comparatively hard resin thereof is selected. A preferable resin coating of the fluorine series is provided wherein a dispersion solution, in which resin powder of polytetrafluoroethylene is dispersed into volatile organic solvent, is glued on the tooth surface and the volatile content thereof is evaporated. Thus, the tooth surface of the toothed belt is coated with fluorine resin powder.

Furthermore, it is preferable that an oil made of fluorine series or silicon series be applied to the surface of the toothed belt. An example of fluorine oil is chlorofluorocarbon, and examples of silicon oil include dimethyl silicon and methylphenyl silicon. Taking silicon oil as an example, it is preferable that the viscosity thereof ranges from 10 cps to 10,000 cps. If the viscosity thereof is less than 10 cps, the volatility of the oil per se would increase and the oil would be liable to evaporate from the tooth surface. On the hand, if the viscosity thereof is more than 10,000 cps, the tooth surface would be susceptible to adhesion of dust and be soiled. The dust thereon would cause noise. Incidentally, in case of fluorine oil, the situation is similar to that of silicon oil as described above.

Next, various experiments have been performed with respect not only to the embodiments of the present invention, but also to COMPARATIVE and CONVENTIONAL EXAMPLES. FIG. 2 through FIG. 4 show each experimental condition. TABLE 2 shows compositions and results of the experiments with respect to EXAMPLE, COMPARATIVE EXAMPLE, and CONVENTIONAL EXAMPLE.

TABLE 2

| Item Example | Example | | | | | | | | |
|---|---|---|---|---|---|---|---|---|---|
| | 1 | 2 | 3 | 4 | 5 | 6 | 7 | 8 | 9 |
| Composition | | | | | | | | | |
| RFL | o | o | o | o | o | o | o | o | o |
| Rubber Glue | | | | | | | | | |
| Inorganic Pigment | | | | | | | | | |
| Titan Oxide | o | | | o | o | o | o | | |
| Calc. Carbonate | | o | | | | | | o | |
| Zinc Oxide | | | o | | | | | | o |
| Graphite | | | | | | | | | |
| Lubricant Resin | | | | | | | | | |
| Silic. A (Note 2) | | | | | o | | | o | o |
| Silic. B (Note 3) | | | | | | o | | | |
| Fluorine (Note 4) | | | | | | | o | | |
| Lubricant Oil | | | | | | | | | |
| Silicon (Note 5) | | | | o | | | | | |
| Fluorine (Note 6) | | | | | | | | | |
| Coefficient of Friction | | | | | | | | | |
| AL | 0.18 | 0.19 | 0.21 | 0.15 | 0.17 | 0.18 | 0.18 | 0.18 | 0.18 |
| POM | 0.16 | 0.17 | 0.20 | 0.12 | 0.15 | 0.18 | 0.16 | 0.18 | 0.17 |
| Amnt. of Wear Powder (mg) | 0.7 | 0.9 | 1.0 | 0.8 | 0.7 | 0.7 | 0.7 | 0.8 | 0.8 |
| Noise Level | | | | | | | | | |
| Running Hour Begin | 0 | 0 | 0 | −2 | −2 | −1 | −1 | −2 | −1 |
| 10 h | 0 | 0 | 0 | 0 | −1 | −1 | −1 | −1 | −1 |
| 20 h | 0 | 0 | 0 | 0 | −1 | −1 | −1 | −1 | −1 |
| 50 h | 0 | 0 | 1 | 0 | −1 | 0 | 0 | 0 | 0 |
| 100 h | 1 | 2 | 1 | 1 | 0 | 1 | 0 | 1 | 1 |

| Item Example | Example | | Comparative Example | | | | Conventional Example | | |
|---|---|---|---|---|---|---|---|---|---|
| | 10 | 11 | 12 | 13 | 14 | 15 | 16 | 17 | 18 |
| Composition | | | | | | | | | |
| RFL | o | o | o | o | | | o | | |
| Rubber Glue | | | | | o | o | | o | o |
| Inorganic Pigment | | | | | | | | | |
| Titan Oxide | o | o | | | | | | | |
| Calc. Carbonate | | | | | | | | | |
| Zinc Oxide | | | | | | | | | |
| Graphite | | | | | | | | | o |
| Lubricant Resin | | | | | | | | | |
| Silic. A (Note 2) | o | o | o | o | | | | | |

TABLE 2-continued

| | | | | | | | | | |
|---|---|---|---|---|---|---|---|---|---|
| Silic. B (Note 3) | | | | | | | | | |
| Fluorine (Note 4) | | | | | | | | | |
| Lubricant Oil | | | | | | | | | |
| Silicon (Note 5) | | ○ | | ○ | ○ | | ○ | | |
| Fluorine (Note 6) | | | ○ | | | | | | |
| Coefficient of Friction | | | | | | | | | |
| AL | | 0.15 | 0.15 | 0.18 | 0.20 | 0.21 | 0.28 | 0.24 | 0.20 | 0.45 |
| POM | | 0.12 | 0.11 | 0.17 | 0.19 | 0.22 | 0.27 | 0.23 | 0.20 | 0.45 |
| Amnt. of Wear Powder (mg) | | 0.4 | 0.5 | 1.5 | 1.8 | 5.5 | 5.9 | 1.7 | 2.3 | 6.5 |
| Noise Level | | | | | | | | | | |
| Running | Begin | −2 | −2 | −2 | 0 | 0 | 2 | 2 | 2 | 6 |
| Hour | 10 h | −2 | −2 | 2 | 0 | 2 | 2 | 2 | 2 | 6 |
| | 20 h | −2 | −2 | 2 | 2 | 4 | 4 | 2 | 2 | 6 |
| | 50 h | −2 | −1 | 4 | 2 | 6 | 6 | 4 | 4 | 6 |
| | 100 h | −2 | −1 | 4 | 4 | 6 | 6 | 4 | 4 | 6 |

Note 1: Coating with Rubber Glue Containing Graphite
Note 2: Silicon Resin Pencil Hardness (HB-H)
Note 3: Silicon Resin Pencil Hardness (3B-HB)
Note 4: Treatment wherein Fluorine Resin is dispersed in Organic Solvent (made by TOYO DRILUBE CO., INC.)
Note 5: Silicon Series Oil
Note 6: Fluorine Series Oil FIG. 2 shows an experimental condition for measuring coefficient of friction. The coefficient was measured by pulling a toothed belt with a weight 20 placed upon its back surface along a horizontal direction on a flat surface of plate 22. Plate 22 is made of aluminum or polyester.

FIG. 3 shows an experimental condition for measuring noise level. A toothed belt is wound around both drive pulley 24 and drive pulley 26. The noise level was measured at the drive pulley 26. The unit of noise level is decibel(dB).

FIG. 4 shows an experimental condition for measuring amount of wear powder. After the completion of an endurance test of toothed belt 10, rubber particles scattered from the toothed belt were collected. The weight of the rubber powder was measured as the total amount of wear powder.

EXAMPLE 1 is an example wherein titanium oxide is used for the inorganic pigment. EXAMPLE 2 is an example wherein calcium carbonate is used for the inorganic pigment. EXAMPLE 3 is an example wherein zinc oxide is used for the inorganic pigment. On the contrary, CONVENTIONAL EXAMPLE 18 cannot include pigment. As will be understood from the comparison with CONVENTIONAL EXAMPLE 16, when the RFL solution contains inorganic pigment, anti-wear property is improved, and the coefficient of friction and noise level are reduced. Incidentally, EXAMPLE 1 (wherein titanium oxide is used) is most excellent in anti-wear property, coefficient of friction, and noise level.

EXAMPLE 4 is an example wherein silicon series oil is glued to the tooth surface of the toothed belt of the foregoing EXAMPLE 1. According to this embodiment, although the coefficient of friction can be reduced, the noise level thereof is the same as that in EXAMPLE 1. In this regard, it is necessary, at least, that inorganic pigment is contained in the RFL solution.

EXAMPLE 5 through EXAMPLE 9 show examples wherein the tooth surface of the toothed belt of the foregoing EXAMPLES 1 through 3 is coated with a resin having lubricity. As will be understood from the comparison with EXAMPLES 1 through 3, EXAMPLE 5 through EXAMPLE 9 can reduce the coefficient of friction and noise level. As will be apparent, as the coefficient of friction decreases, the generation of wear powder is prevented.

Further, as will be understood from the comparison with COMPARATIVE EXAMPLE 13, merely coating the tooth surface with resin is not enough to reduce noise level; inorganic pigments must be contained in the RFL solution as a precondition. Particularly, there is no substantial difference in noise level after the beginning of applying stress compared with the CONVENTIONAL EXAMPLE.

EXAMPLES 10 and 11 show examples wherein silicon series oil or fluorine series oil is glued to the tooth surface of the toothed belt of the foregoing EXAMPLE 5, thereby improving anti-wear property and reducing the coefficient of friction and noise level, which, in particular, can be maintained for a long time.

As will be seen from the foregoing description, according to the toothed belt of the present invention, because the tooth sheet is treated by the RFL solution including inorganic pigment, an RFL solution-impregnated layer is formed at the tooth surface, so that anti-wear property thereof can be improved and generation of the wear powder can be prevented. By using inorganic pigments, those colors of which are other than black series, the wear powder, if produced, would be hard to be noticeable. Accordingly, the toothed belt of the present invention is preferably adapted to OA related equipment and industrial machines in general.

Further, because the tooth surface of the toothed belt is coated with lubricant resin, the coefficient of friction of the tooth surface of the toothed belt can be reduced, and generation of wear powder and noise can be prevented.

Furthermore, because oil made of fluorine series or silicon series is applied to the surface of the toothed belt, the coefficient of friction of the tooth surface of the toothed belt can be reduced, and generation of wear powder and noise can be prevented.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. A toothed belt, compromising a tensile body embedded therewithin and a tooth surface, said tooth surface being coated with a tooth sheet, wherein said tooth sheet is treated by resorcin-formaldehyde-latex solution containing inorganic pigments other than black series pigments.

2. A toothed belt as recited in claim 1, wherein said tooth surface is coated with a lubricant resin.

3. A toothed belt as recited in claim 1 or 2, wherein fluorine series oil or silicon series oil is applied to said tooth surface.

* * * * *